(12) United States Patent
Chen et al.

(10) Patent No.: US 7,510,819 B2
(45) Date of Patent: Mar. 31, 2009

(54) THIN FILM SOLID OXIDE FUEL CELL WITH LITHOGRAPHICALLY PATTERNED ELECTROLYTE AND ANODE LAYERS

(75) Inventors: Xin Chen, Houston, TX (US); Naijuan Wu, Houston, TX (US); Alex Ignatiev, Houston, TX (US); Yuxiang Zhou, Houston, TX (US)

(73) Assignee: Board of Regents, University of Houston, Houston, TX (US)

( * ) Notice: Subject to any disclaimer, the term of this patent is extended or adjusted under 35 U.S.C. 154(b) by 505 days.

(21) Appl. No.: 11/436,392

(22) Filed: May 18, 2006

(65) Prior Publication Data

US 2006/0210706 A1     Sep. 21, 2006

Related U.S. Application Data

(63) Continuation-in-part of application No. 10/704,725, filed on Nov. 10, 2003, now Pat. No. 7,381,492.

(51) Int. Cl.
*B05D 5/12* (2006.01)
*H01M 4/88* (2006.01)

(52) U.S. Cl. .................. 430/320; 429/100; 429/159; 502/101; 427/115

(58) Field of Classification Search .............. None
See application file for complete search history.

(56) References Cited

U.S. PATENT DOCUMENTS

| | | | |
|---|---|---|---|
| 4,191,888 A | 3/1980 | Meadows | |
| 5,106,654 A | 4/1992 | Isenberg | |
| 5,641,585 A | 6/1997 | Lessing | |
| 5,650,378 A | 7/1997 | Iijima et al. | |
| 5,656,387 A | 8/1997 | Barnett et al. | |
| 5,753,385 A | 5/1998 | Jankowski et al. | |
| 5,872,080 A | 2/1999 | Arendt et al. | |
| 5,968,877 A | 10/1999 | Budai et al. | |
| 6,007,683 A | 12/1999 | Jankowski et al. | |

(Continued)

OTHER PUBLICATIONS

Chen, et al., "Pulsed laser deposition of conducting porous La-Sr-Co-O films", Thin Solid Films 342, p. 61-66 (1999).

(Continued)

*Primary Examiner*—Mark F Huff
*Assistant Examiner*—Anna L Verderame
(74) *Attorney, Agent, or Firm*—Jennifer S. Sickler; Gardere Wynne Sewell LLP

(57) ABSTRACT

A thin film solid oxide fuel cell (TFSOFC) having a porous metallic anode and a porous cathode is provided. The fuel cell is formed by using a continuous metal foil as a substrate onto which is deposited a thin anode metal layer which is then patterned to reveal an array of pores in the anode. A dense thin film electrolyte is then deposited onto the porous anode layer overcoating the anode and filling the anode pores. The substrate foil layer is then removed to allow for exposure of the porous anode/electrolyte to fuel. The cathode is then formed on the electrolyte by depositing a cathode thin film cap using known film deposition techniques. Further processing may be used to increase the porosity of the electrodes. The metal foil may be treated to have an atomically ordered surface, which makes possible an atomically ordered anode and atomically ordered thin film electrolyte for improved performance.

16 Claims, 7 Drawing Sheets

U.S. PATENT DOCUMENTS

| | | |
|---|---|---|
| 6,074,771 A | 6/2000 | Cubukcu et al. |
| 6,326,096 B1 | 12/2001 | Virkar et al. |
| 6,451,450 B1 | 9/2002 | Goyal et al. |
| 6,645,656 B1 | 11/2003 | Chen et al. |
| 2006/0063680 A1 | 3/2006 | Ignatiev et al. |

OTHER PUBLICATIONS

Chen, et al., "Structure and conducting properties of $LA_{0.5}SR_{0.5}CoO_{3-\delta}$ films on YSZ", Thin Solid Films 350, p. 130-137 (1999).

Coccia, et al., "Pulsed laser deposition of novel materials for thin film solid oxide fuel cell applications: $Ce_{0.9}Gd_{0.1}O_{1.95}$, $La_{0.7}Sr_{0.3}CoO_y$ and $La_{0.7}Sr_{0.3}Co_{0.2}Fe_{0.8}O_y$", Applied Surface Science 96-98, p. 795-801 (1996).

de Souza, et al., "Reduced-Temperature Solid Oxide Fuel Cell Based on YSZ Thin-Film Electrolyte", J. Electrochem. Soc., vol. 144, No. 3, p. L35-L37 (Mar. 1997).

Goyal, et al., "High critical current density superconducting tapes by epitaxial deposition of $YBa_2Cu_3O_2$ thick films on biaxially textured metals", Appl. Phys. Lett., vol. 69 No. 12 (1996).

Ignatiev, et al, "Photo-Assisted MOCVD Fabrication of YBCO Thick Films and Buffer Layers on Flexible Metal Substrates for Wire Applications," International Journal of Modern Physics B, vol. 12, Nos. 29, 30 & 31, p. 3162-3173 (1998).

Jankowski et al. "Testing of Solid-Oxide Fuel Cells for Micro to macro Power Generation," Proc. Electrochem. Soc., 99-19, Solid Oxide Fuel Cells (SOFC VI), p. 932-937 (1999).

Michibata, et al., "Preparation of Stabilized Zirconia Electrolyte Films by Vacuum Evaporation", p. 1070-1071 (1990).

Minh, "Ceramic Fuel Cells", J. Am. Ceram. Soc., 76[3] p. 563-588 (1993).

Minh, et al., "Electrolyte", Science and Technology of Ceramic Fuel Cells, Chapter 4, p. 69-115 (1995).

Mrowec and Weber, "Gas Corrosion of Metals," National Bureau of Standards and the National Science Foudation (1978)*.

Pan, et al., "Pure and doped $Ce_o2$ thin films prepared by MOCVD process," Thin Solid Films 324, p. 89-93 (1998).

Wu, et al., "High current $YBa_2Cu_3O_{7-\delta}$ thick films on flexible nickel substrates with textured buffer layers", Appl. Phys. Lett., vol. 65, No. 15, p. 1961-1963 (1994).

Fig. 2
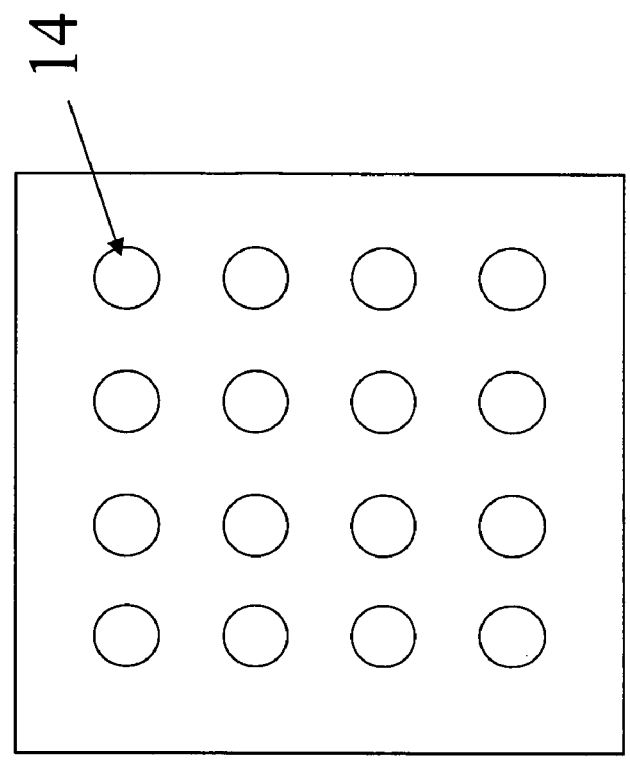
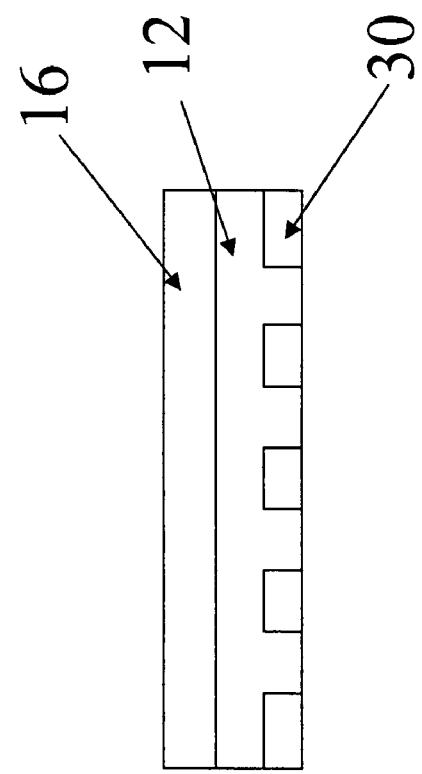

a) SEM of the dense bottom LSCO layer b) SEM on the top of the PLD made porous LSCO film

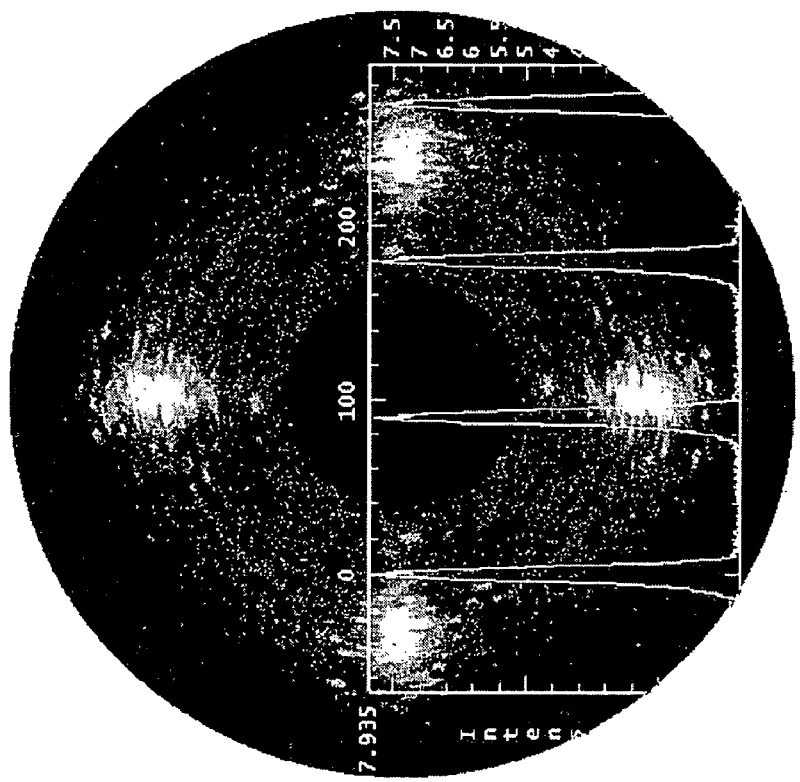
Fig. 6 (b) YSZ
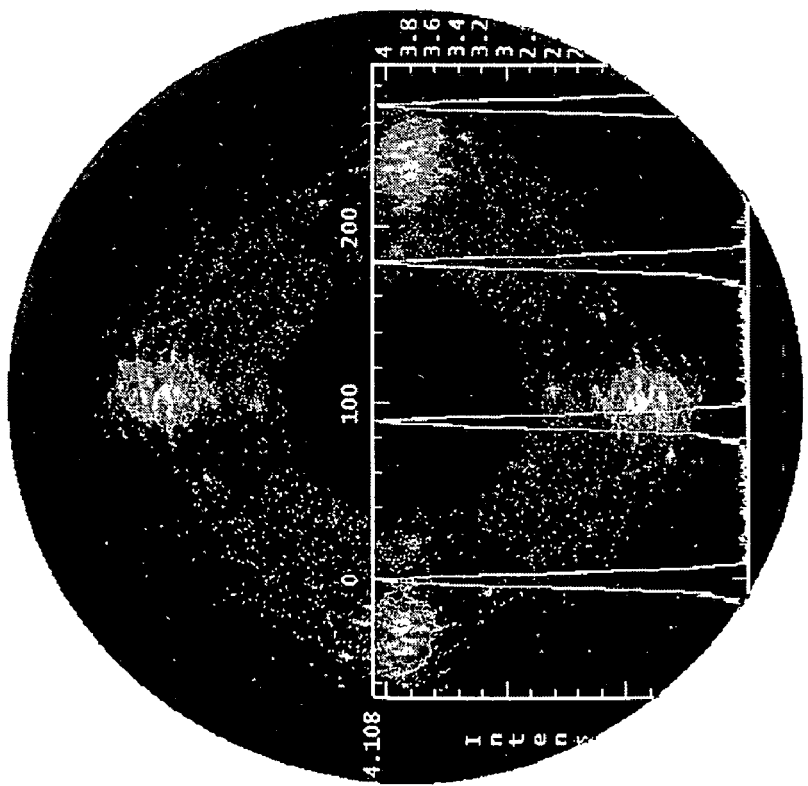
Fig. 6 (a) SCO

THIN FILM SOLID OXIDE FUEL CELL WITH LITHOGRAPHICALLY PATTERNED ELECTROLYTE AND ANODE LAYERS

CROSS-REFERENCES TO RELATED APPLICATIONS

This application is a continuation-in-part of pending application Ser. No. 10/704,725, filed Nov. 10, 2003.

BACKGROUND OF THE INVENTION

1. Field of the Invention

The present invention pertains to electrochemical devices such as solid oxide fuel cells (SOFCs) or ceramic fuel cells, particularly thin film solid oxide fuel cells (TFSOFCs). More particularly, a porous metallic anode and a thin film conducting oxide porous cathode are provided, along with methods for forming the electrodes and a thin film electrolyte.

2. Description of Related Art

Fuel cells are energy-converting devices that use an oxidizer (e.g. oxygen in air) to convert the chemical energy in fuel (e.g. hydrogen) into electricity. A SOFC (also called a "ceramic fuel cell") generally comprises a solid electrolyte layer with an oxidizer electrode (cathode) on one side of the electrolyte and a fuel electrode (anode) on the other side. The electrodes are required to be porous, or at least permeable to oxidizer at the cathode and fuel at the anode, while the electrolyte layer is required to be dense so as to prevent leakage of gas across the layer. A TFSOFC has a thin electrolyte layer, on the order of ~0.01-10 micrometers thick, as described, for example, in U.S. Pat. No. 6,645,656. This reduces the ohmic resistance of the electrolyte and increases the power density of the fuel cell. Because of the low electrolyte resistance, the TFSOFC can operate at lower temperatures. This increases the reliability and allows wider choices of materials for TFSOFC applications. Using the TFSOFC design can also reduce materials costs and reduce the volume and mass of the fuel cell for a given power output.

U.S. Pat. No. 5,753,385 discloses physical and chemical deposition techniques to synthesize the basic components of a TFSOFC in which 1-750 micrometers thick electrodes are formed from ceramic powders sputter coated with an appropriate metal and sintered to a porous compact. The electrolyte of <10 micrometers thick is formed by reactive magnetron deposition. The electrolyte-electrode interface of 1-2 micrometers thick region is formed by chemical vapor deposition of zirconia compounds onto the porous electrodes.

U.S. Pat. No. 5,656,387 discloses a nickel and yttrium-stabilized zirconia (YSZ) anode of ~2 micrometers thick and a method for making by DC magnetron sputtering. The films were deposited on a surface of yttria-stabilized zirconia (YSZ) of 5 micrometers thick on bulk-ceramic LSM_YSZ support cathodes.

U.S. Pat. No. 5,106,654 discloses a method for matching thermal coefficients of expansion in fuel cell or other electrochemical devices. A tubular configuration with ~2 mm tube wall thickness and 1-100 micrometers thick YSZ electrolyte thickness is described.

YSZ thin film fuel cells have generally been formed by depositing the YSZ electrolyte on a substrate that is not crystallographically ordered. Therefore, the YSZ is not ordered and thicker layers must be deposited to form a layer impermeable to gas.

To make thin film solid oxide fuel cells more efficient and less expensive to fabricate, improved methods for forming the porous electrodes and the non-porous electrolyte used in such devices are needed. The electrolyte should be defect-free to avoid charge and gas leakage across the cell, and thin to provide lower electrical resistance at moderate temperatures. Interconnect layers to make possible stacking of cells should be provided. An initial description of a epitaxially-grown and lithographically patterned thin film solid oxide fuel cell has been provided by Xin Chen, Naijuan Wu, and Alex Ignatiev in U.S. Pat. No. 6,645,656, which is incorporated herein by this reference. Extension of that description is disclosed here in the form of an advanced design for a thin film solid oxide fuel cell.

SUMMARY OF THE INVENTION

A method for forming a thin film solid oxide fuel cell (TFSOFC) with a porous metallic anode and an oxidizer-permeable cathode on opposite surfaces of a dense electrolyte layer is provided. The electrolyte layer may have an ordered crystal structure.

The fabrication process uses a thin dense metallic material as a substrate material onto which the thin film fuel cell will be fabricated. As an example, a copper foil may be used. The foil may be appropriately rolled or otherwise processed to produce an ordered crystal structure that allows for epitaxial growth of additional atomically ordered layers on the copper substrate. A porous nickel or platinum (or other material) anode layer is fabricated on the copper substrate by photolithographic patterning and electrochemical deposition or other deposition method. The nickel or platinum layer will then become the self-supported anode of the fuel cell after the electrolyte and cathode layers are grown on it, and the bottom substrate copper layer is etched away to expose the porous structure in the nickel/platinum layer.

Thin film oxide deposition technologies such as pulsed laser deposition (PLD), or metal organic chemical vapor deposition (MOCVD) can be used for the deposition of the oxide electrolyte as well as for the conducting oxide cathode. PLD is an ideal vehicle to develop very thin films for TFSOFC applications, while MOCVD is good for large area thin film fabrication. Sputtering, evaporation sol-gel, metal organic deposition (MOD), electron-beam evaporation, chemical vapor deposition (CVD), molecular beam epitaxy (MBE), or other oxide film deposition techniques can also be used. Because the substrate is composed of a nonporous atomically ordered metal foil, and even though the textured anode layer is made porous lithographically, a dense electrolyte layer is easily deposited on it, and the difficulty of forming a dense, uniform electrolyte layer on a completely porous substrate is avoided. Also, because the metal anode layer is used as a support, the electrolyte layer can be very thin. In addition, since the substrate support layer and the patterned metal anode are atomically ordered, an electrolyte film with ordered crystal structure can be grown on the anode/support structures.

Chemical or physical etching or a mechanical process may be used to remove the bottom support metal foil. The cathode layer can be deposited on the opposite side of the electrolyte layer, either before or after removal of the support substrate. The cathode is usually a conducting oxide layer, which can be deposited by PLD, MOCVD or other suitable oxide film deposition technique, thus forming the TFSOFC.

A mixed ionic and electronic conductor film between the anode and the electrolyte may also be deposited to enhance the activity of the porous anode structure. Stacked cells may be epitaxially grown using a substrate having an atomically ordered surface.

DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 2 is a schematic representation of a solid oxide fuel cell with a porous metallic electrode.

FIG. 6 shows the x-ray diffraction pole-figures and phi-scans of the (111) peaks of YSZ and of Sm-doped $CeO_2$ for a YSZ/Sm—$CeO_2$ multilayer structure grown on roll-textured nickel foil indicating atomically ordered doped $CeO_2$ and subsequently grown atomically ordered YSZ.

DETAILED DESCRIPTION OF THE INVENTION

Figure 1:
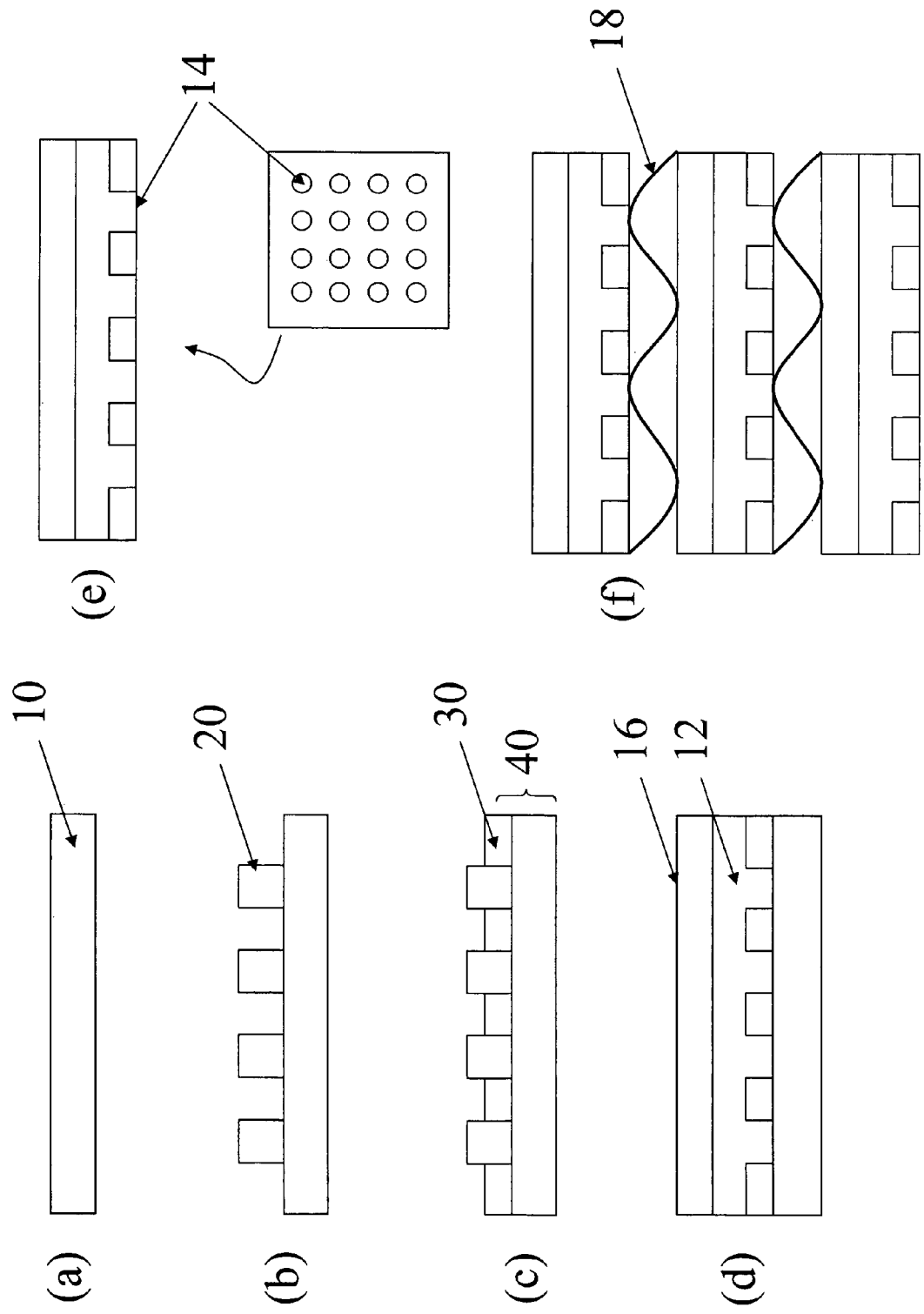
FIG. 1 is a schematic representation of the SOFC process.

It is preferred to fabricate a TFSOFC with a thin electrolyte layer to reduce the resistive loss in the electrolyte and decrease the temperature of operation. The electrolyte layer should be dense and pore-free to prevent gas leakage. It is also preferred that porous electrodes be used to increase the gas transport rate. These requirements increase the difficulty in the fabrication of TFSOFCs. We disclose herein an epitaxial film growth method to make a TFSOFC with the combined structure of a dense thin film electrolyte with porous or gas-permeable electrodes. As demonstrated in FIG. 1(a), the method first uses a thin dense metallic material 10, such as copper foil, as a substrate for the cell fabrication. A photo resist pattern 20 is made on the copper foil (FIG. 1(b)) that represents the inverse pattern for a porous anode, and the anode metal 30 such as nickel is deposited on the substrate to form a anode layer 40 as shown in FIG. 1(c). The photo resist is then removed to expose pores in the anode layer, and a dense but thin electrolyte layer 12 is then deposited on the patterned porous anode/substrate system, as shown in FIG. 1(d), and a cathode layer 16 may be deposited on the electrolyte 12. The substrate metal layer is then selectively etched away, resulting in the exposure of the porous anode with electrolyte filling the pores 14 (FIG. 1(e)). The cathode 16 of the SOFC is deposited in thin film form on electrolyte 12, either before or after etching of anode 10. Further processing can be used to improve the permeability and performance of the electrodes, as disclosed below. The SOFCs fabricated by this method can then be packaged into stacks, as indicated in FIG. 1(f), where interconnects 18 couple the SOFCs.

A schematic example of SOFC fabricated with the method provided here is shown in FIG. 2. The electrodeposited anode 30 has pores in it 14 that have been filled by electrolyte 12. Cathode 16 has been formed on electrolyte 12.

A preferred embodiment of a process for making a thin film solid oxide fuel cell is described as follows. It should be understood that the description of a preferred embodiment does not limit the scope of the methods and apparatus disclosed herein.

A copper foil with a nominal thickness of 25 μm is used as the substrate and a top nickel layer of nominally 5 μm is deposited on it to be used as the anode of the device. The substrate thickness and the anode thickness can be varied to accommodate a specific fuel cell design. Any variety of substrate foils can be used with selection coming from the need for atomic ordering of the anode and the electrolyte deposited on the substrate foil, and the need for chemical or mechanical removal of the substrate. The anode layer can be deposited onto the substrate by a number of techniques such as electrodeposition, sputtering, physical vapor deposition and chemical vapor deposition, as taught in the following U.S. Patents, which are incorporated herein by this reference:

| | |
|---|---|
| 6,645,656 | Thin film solid oxide fuel cell and method for forming |
| 5,753,385 | Hybrid deposition of thin film solid oxide fuel cells and electrolyzers |
| 5,656,387 | Solid-oxide fuel cells having nickel and yttria-stabilized zirconia anodes and method of manufacture |
| 5,106,654 | Method of forming a dense, high temperature electronically conductive composite layer on a porous ceramic substrate |

The substrate foil can be treated to expose an atomically ordered surface by roll-texturing as described in the following U.S. Patents, which are incorporated herein by this reference:

| | |
|---|---|
| 5,968,877 | High Tc YBCO superconductor deposited on biaxially textured Ni substrate |
| 6,451,450 | Method of depositing a protective layer over a biaxially textured alloy substrate and composition therefrom |

The substrate foil can also be treated to expose an atomically ordered surface by ion beam assisted deposition (IBAD) as described in the following U.S. Patents, which are incorporated herein by this reference:

| | |
|---|---|
| 5,650,378 | Method of making polycrystalline thin film and superconducting oxide body |
| 5,872,080 | High temperature superconducting thick films |

Such an atomically-ordered surface for the substrate allows for the growth of an atomically ordered anode layer and subsequently atomically ordered electrolyte layer as well as subsequent layers such as the cathode and even the conducting interconnect layers that themselves could act as substrates for growth of stacked cells. Any metal or alloy that is stable under the operating temperature and reducing atmosphere at the anode, and has a good lattice match to the atomically ordered substrate can be used An electrolyte thin film oxide layer can be deposited on the substrate/anode by a number of thin film deposition techniques such as PLD, MOCVD, sputtering, sol gel/MOD process. Yttria stabilized zirconia (YSZ) is an example of a solid oxide electrolyte (other solid electrolytes may be used), and under PLD a target of YSZ is used to deposit a thin film of YSZ on the metallic substrate/anode structure. Pure hydrogen or "forming gas" (4% hydrogen with 96% argon) or other reducing gas mixtures can be introduced into the thin film deposition chamber to reduce oxidization of the nickel or other metal substrate/anode under any of the oxide thin film growth techniques. Other thin film oxides that can be used as electrolytes include doped $LaGaO_3$, doped $CeO_2$ and multilayers of oxides such as YSZ/doped-$CeO_2$.

As an example, PLD using an excimer laser can be used for the deposition of the electrolyte films. The thin film growth may be continued to yield an electrolyte layer having a thickness in the range from about 0.01 μm to about 10 μm (depending on the application). The electrolyte layer formed on a typical metal foil substrate generally has no long-range atomic order. However, the electrolyte may be preferentially atomically ordered with a given crystallographic direction normal to the growth surface or with atomic order both normal to and in the plane of the growth surface (the surface of the substrate) by using an atomically ordered substrate and an epitaxially grown, atomically ordered anode layer. For example, using roll-textured metal foil substrate such as described above, and growing an epitaxially ordered anode layer, the electrolyte can be grown with atomic order both normal to and in the plane of the growth surface.

Figure 3:
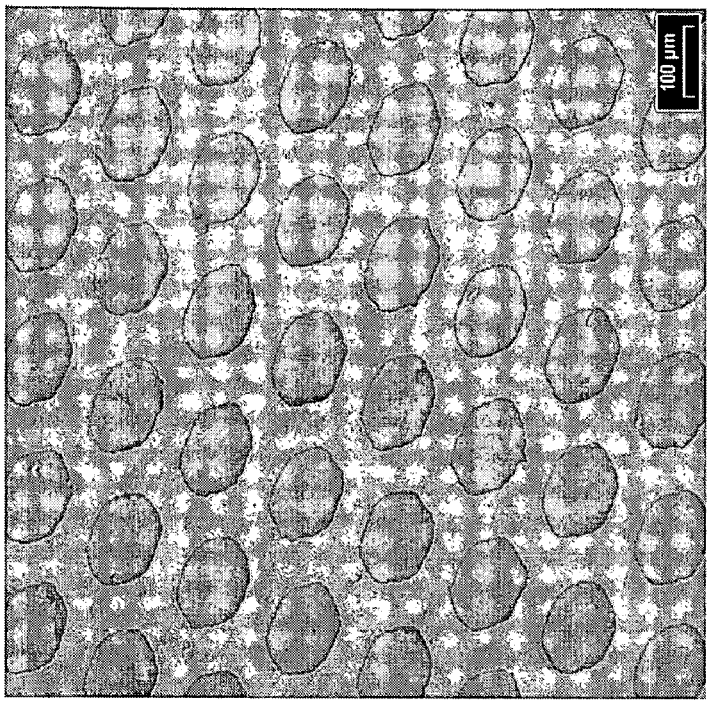
FIG. 3 shows SEM micrograph of: a) micro patterned nickel anode on metal foil substrates; and b) after anode/electrolyte deposition and substrate removal.
Figure 3:
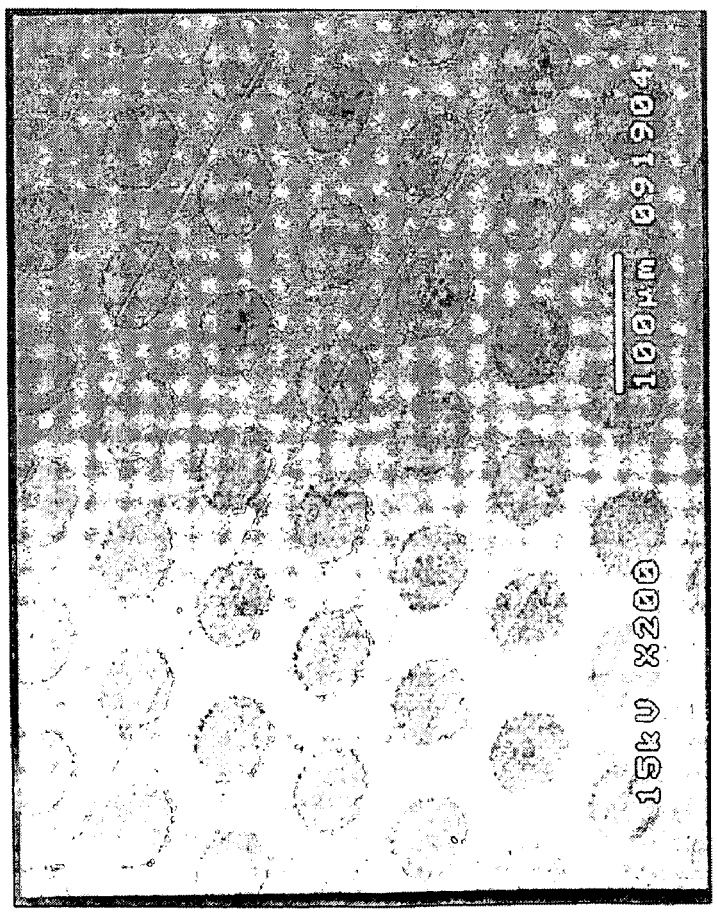

The metallic substrate/anode layer/electrolyte layer thin film structure may then be subjected to procedure to remove the substrate thus expose the patterned anode substrate with the anode pores filled with electrolyte to expose pores in the metallic anode. A number of methods can be used to remove that substrate including mechanical removal, wet, chemical etching, and particularly dry etching. For wet etching, the complete structure is placed in an etching solution such as (but not restricted to) ferric chloride for etching the metallic copper substrate. Other etching solutions could also be used for copper or other metallic substrate etching. The thin film structure is maintained in the etching bath until the patterned anode area is exposed. FIG. 3(a) is the SEM micrograph of a sample showing an array of pores in a patterned nickel anode, which is ready to be filled with electrolyte. The etch process is such that it leaves the porous anode and dense oxide electrolyte intact, thus not resulting in gas leakage through the electrolyte, which would reduce performance of the fuel cell. A sample after the anode/electrolyte deposition and substrate removal is shown in FIG. 3(b).

Figure 4:
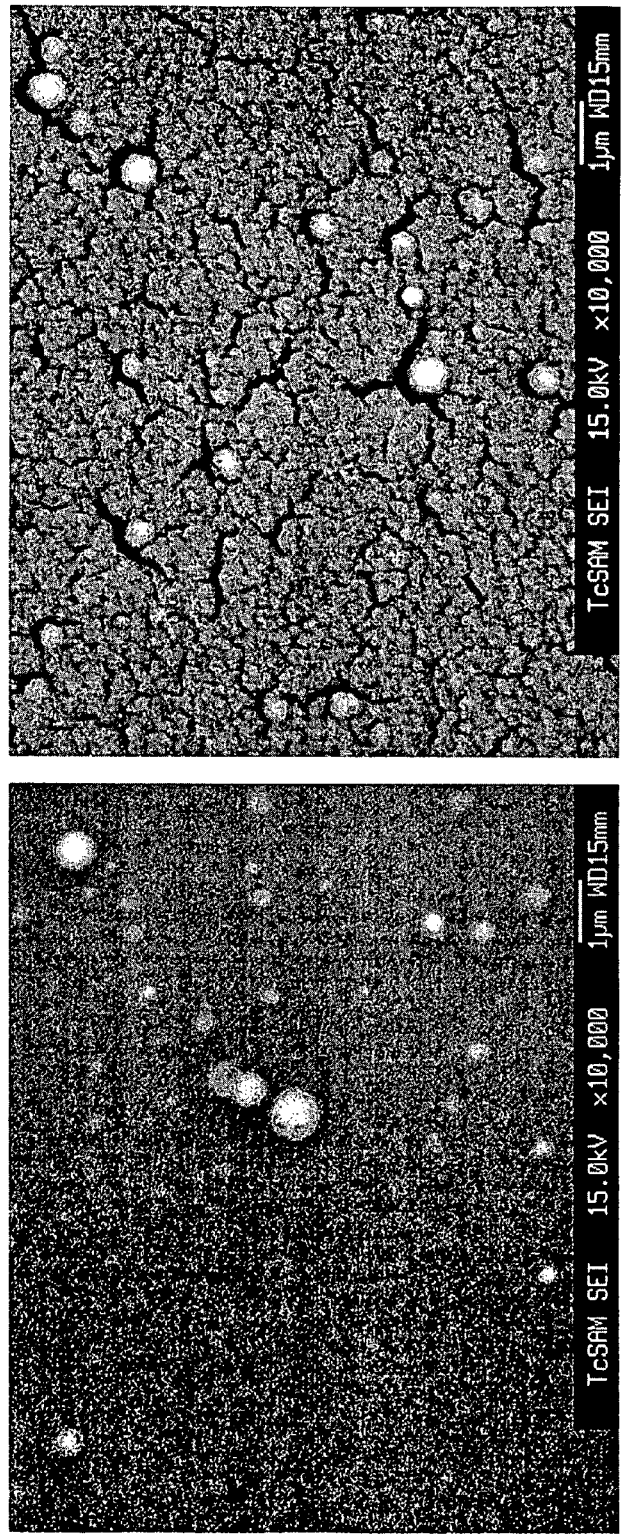
FIG. 4 shows an SEM micrograph of LSCO films on YSZ developed by PLD: a) a dense film; b) a porous film.

After removal of the substrate layer, any conducting oxide cathode thin film may be deposited on top of the oxide electrolyte (YSZ) to form the SOFC. A $La_{0.5}Sr_{0.5}CoO_{3-\delta}$ (LSCO) thin film is used as the cathode material in this example, although other oxide thin film cathode materials can also be used. The LSCO thin film cathode can be deposited by PLD, sputtering, MOCVD or other oxide deposition techniques. FIG. 4a is an SEM micrograph of an LSCO cathode deposited on YSZ by PLD, showing that the LSCO film is dense and pore-free. There are small particles on the PLD-formed LSCO film, which are often seen on oxide films fabricated by PLD. This may be a benefit for thin film SOFC development since it increases the surface area and could increase the reaction rate at the cathode. Details of PLD deposition of LSCO on YSZ are described in the following U.S. Patent, which is incorporated herein by this reference:

| 6,645,656 | Thin film solid oxide fuel cell and method for forming |
|---|---|

For the case of an atomically ordered electrolyte, i.e. one formed on an atomically ordered anode substrate, the cathode can also be deposited under conditions such that it is also atomically ordered, i.e., it is grown epitaxially on the ordered electrolyte with a specific crystallographic direction normal to the electrolyte surface and having additional in-plane atomic ordering.

Additional porosity may be desired in the cathode. The cathode can be made more porous by specific processing as described in the following U.S. Pat., which is incorporated herein by this reference:

| 6,645,656 | Thin film solid oxide fuel cell and method for forming |
|---|---|

To enhance LSCO film porosity, the LSCO films can be deposited at room temperature onto the electrolyte and then heated to high temperature for several hours resulting in a porous columnar structure. The electrical conductivity of the LSCO is maintained in this process at a level of ~$10^{-2}$ ohm-cm or better. FIG. 4b is an SEM micrograph of a porous LSCO film fabricated on YSZ by PLD. The dense and the porous LSCO films can be deposited together to make porous/dense multiplayer composite cathode films.

The above example shows one instance of application of the method disclosed herein for the fabrication of planar thin film solid oxide fuel cells. It can also be used in other designs such as tubular and monolithic fuel cells. It also not only applies to SOFC's with a simple electrolyte layer, but also to those with complex electrolytes such as a YSZ/doped $CeO_2$ multi-layer electrolyte. It not only applies to SOFC's, but it also applies to the fabrication of other electrochemical devices with combined thin film electrolyte/porous electrode structure. The thin oxide films can be deposited not only as non-ordered polycrystalline films, but also as crystallographically ordered films.

Grain boundaries usually have much lower ion conductivities than the bulk of an electrolyte material. By developing crystallographically ordered thin electrolyte films, grain boundaries can be reduced or even removed in the electrolyte, thereby increasing ion conductivity and reducing the resistance of the electrolyte. Crystallographically-ordered films of YSZ and $CeO_2$ have been deposited on metallic substrates using a unique photo-assisted MOCVD technique (PhA-MOCVD) as described in the following U.S. Patents, which are incorporated herein by this reference:

| Appl. 20060063680 | System and method for joining superconductivity tape |
|---|---|
| 6,645,656 | Thin film solid oxide fuel cell and method for forming |

Figure 5:
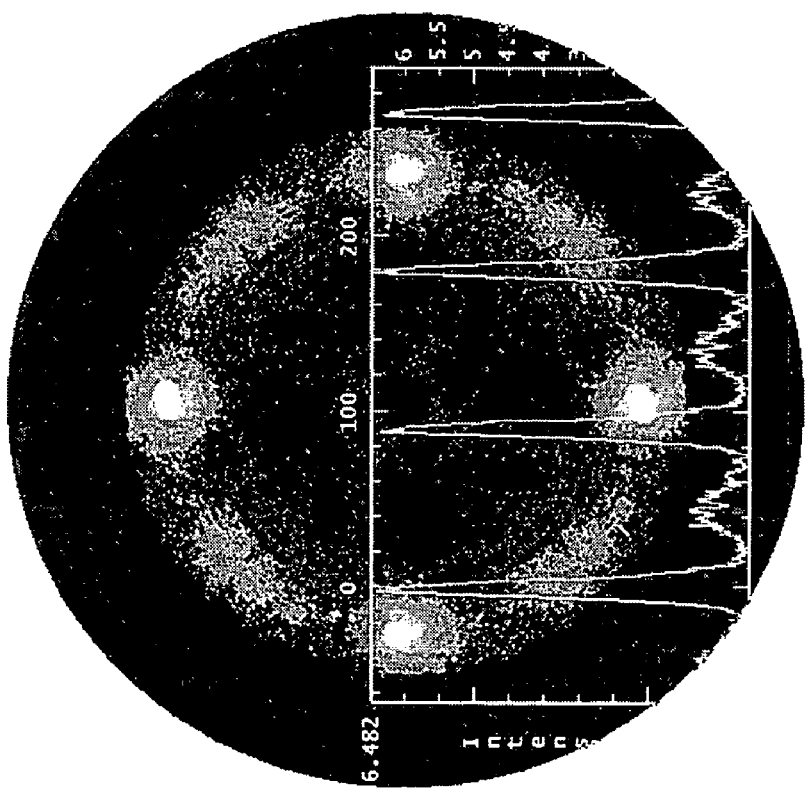
FIG. 5 shows the x-ray diffraction pole-figure and phi-scan of the (111) peak of YSZ deposited on roll-textured nickel foil indicating atomically ordered YSZ grown on roll-textured nickel foil.

This technique has been used to fabricate highly ordered YSZ/$CeO_2$ multi-layers on roll-textured nickel foils, as demonstrated by the x-ray diffraction (XRD) data shown in FIGS. 5 and 6. FIG. 5 is an XRD pole-figure and phi-scan of the (111) peak of YSZ deposited by PLD on roll-textured nickel foil. FIG. 6 is the XRD pole-figure and phi-scan of the (111) peak of YSZ and Sm doped $CeO_2$ from a YSZ/Sm—$CeO_2$ sample developed on roll-textured nickel foil with PLD. The full width at half max (FWHM) of the phi-scan peaks in both figures are only several degrees wide, indicating good crystalline ordering of the YSZ film on the metallic substrate and of the YSZ film grown on the Sm—$CeO_2$ layer. This epitaxial growth technique can be directly used for the SOFC development to obtain crystalline ordering of the YSZ film, which is indicative of the desired high electrical conductivity of the electrolyte.

This disclosure is not limited to the examples of thin film oxide materials cited above. For example, $La_{1-x}Sr_xMnO_3$, a widely used cathode material for SOFCs, may be used with the methods disclosed here. It has high electrical conductivity, adequate chemical and structural compatibility with YSZ electrolytes, and an acceptable coefficient of thermal expansion match with other SOFC components. $La_{1-x}Sr_xCo_{1-y}Fe_yO_{3-\delta}$ and $La_{1-x}Sr_xCo_{1-y}Mn_yO_3$ are other cathode materials that may be used for SOFCs working at lowered temperature. Elements such as Y, Ca, Ba, Pr, Nd, Cu, and Ni can also be used to replace elements in the cathode material in order to modify the characteristics and performance of the cathode. Cathodes containing $In_2O_3$ and $RuO_2$ can also be used as they may yield excellent electrical conductivity for SOFC applications. The cathode can be formed before the etching of the anode or after the etching.

The electrolyte can also be varied by incorporating not only doped zirconia such as YSZ, but also other electrolyte materials such as doped-$CeO_2$, stabilized $B_2O_3$, perovskite oxide ion conductors such as $La_{1-x}Sr_xGa_{1-y}Mg_yO_3$ and doped $BaCeO_3$ and pyrochlore oxides (with the general formula $A_2B_2O_7$) such as $Gd_2(Zr_xTi_{1-x})_2O_7$ and $Y_2(Zr_xTi_{1-x})_2O_7$. In addition, not only can single layers electrolyte be used, but multi-layer and more complicated electrolyte structures can also be formed. For example, doped $CeO_2$, when used as an electrolyte, has very high ionic conductivity and also shows reduced overvoltage at the electrode/electrolyte interfaces. However, $CeO_2$ can be reduced at low oxygen partial pressures to exhibit electronic conductivity. If a YSZ/doped-$CeO_2$ multi-layer structure is used for the electrolyte, as in the example shown in FIG. 6, the ion conductivity advantage of doped-$CeO_2$ is retained, while the electronic conductivity problem can be mitigated by the insulating YSZ layer.

Figure 7:
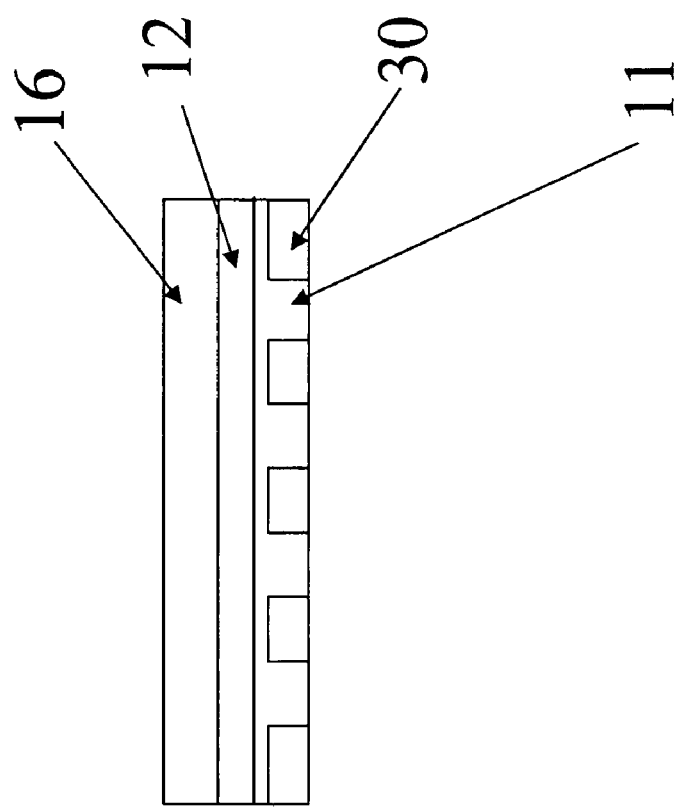
FIG. 7 illustrates a mixed ionic and electronic conductor film between the anode and electrolyte films.

The anode can be fabricated not only from nickel, but may be made from other metals and alloys such as copper, INCONEL, Haynes Alloy or HASTELLOY. In addition, the metal substrate can be treated with a buffer layer or layers so as to better integrate with the thin film electrolyte. These buffer layers may be of varying structure and composition, and will generally be used to match lattice parameters of the substrate and overlayer for optimal epitaxial growth, to better match thermal expansion coefficients of the substrate and overlayer to minimize thermal stress cracking, and to act as diffusion barriers to mitigate interdiffusion of species from or to the substrate to or from the overlayer, while still maintaining the fuel cell electrochemical requirements of reduced interface resistance and high ionic conductivity. Since the fuel-oxidizer activity for the YSZ/Nickel anode structure is mostly limited to the triple-phase boundary, the overall activity of the porous anode structure can be enhanced by increasing the area of the triple-phase boundary. This can be done in several ways including the already noted patterning of high-perimeter pores in the anode, the addition of a layer of porous anode material such as a nickel-YSZ cermet onto the anode after substrate removal, or the deposition of a mixed ionic and electronic conductor film between the anode and the electrolyte. Such a mixed ionic/electronic conducting film is shown as 11, FIG. 7. The mixed conductor film will extend the anode activity beyond the three-phase boundary to across the whole exposed mixed conductor surface. For example, doped-$CeO_2$ can be reduced to show mixed conducting character and can be used for the purpose of forming film 11. To exhibit mixed conductor behavior, the doped $CeO_2$ film can be grown under highly reduced conditions. $CeO_2$ can also be reduced by changing its doping level and/or dopant material. Another possible enhancement at the anode is to use a hydrogen-conducting metal or alloy such as palladium or palladium alloy as the anode for a proton type SOFC.

The anode formation method disclosed herein is different from existing techniques that form a porous anode on an electrolyte surface in that it uses the substrate and the metallic anode formed on it as the support onto which the electrolytes layer is formed. As a result, the electrolyte layer can be made very thin, avoiding the self-supporting problem for a thin electrolyte layer in SOFC fabrication.

Any interconnect material can be used for the SOFC design disclosed here as long as it is stable to both the oxidizing and reducing environments of the fuel cell at the temperature of operation. For example, $LaCrO_3$ is the most used interconnect material for SOFCs. Other interconnect materials include oxides such as doped $LaCrO_3$, doped $CoCr_2O_4$ and doped $YCrO_3$, metals and alloys such as nickel, chromium, INCONEL, stainless steel, and other chromium-iron alloys, and oxide-dispersed or coated metals and alloys. Metals and alloys are of great interest for use as an interconnect material in the TFSOFC disclosed here because they may be the same material as the anode disclosed here (e.g., as described in U.S. Pat. No. 5,106,654, which is incorporated herein by this reference, where nickel foil is used as an interconnect for an SOFC), and they may be fabricated at the same time as the anode. Metals and alloys can be made oxidation-resistant and hence can work well at TFSOFC working temperatures that are lower than bulk SOFCs. Oxide dispersion and oxide coating can improve the oxidation resistance and strength of the metals and alloys, and also improve the thermal match with other TFSOFC components. In addition, when these metals and alloys are the same as the anode material, the TFSOFC fabrication can be greatly simplified. The interconnect material can be deposited using thin film deposition techniques disclosed here for depositing other films in the TFSOFC. For example, PLD, MOCVD, sputtering, evaporation or chemical deposition may be used. These films can then be patterned to provide the flow channels needed for fuel and oxidizer transport in the interconnect region.

The commonly used stack designs can be used with the materials and methods disclosed here. For example, the methods disclosed here can be used to fabricate TFSOFC stacks with tubular, segmented-cell-in-series, monolithic, and flat-plate designs. Monolithic, and flat-plate design are of the greatest interest with the systems disclosed here, because the TFSOFCs can be made in a planar shape, which is good for forming a porous anode by patterning and etching using photolithography. A tubular fuel cell can be fabricated on a tubular metal substrate or on a flat metal foil, which is flexible and can be bent into tubular form after the film deposition processes.

A thin film solid oxide fuel cell was fabricated by the methods described above. The data were obtained for a thin film fuel cell incorporating a polycrystalline nickel foil based porous anode, a YSZ electrolyte layer and a porous LSCO cathode layer. The cell had a total area of ~0.1 cm². The electrodes and electrolyte were formed by the PLD process. The fuel cell was supplied hydrogen and oxygen and electrical current and voltage output were measured. Results are shown in FIG. 9. Note that maximum power output of more than 100 mW/cm² was obtained at the low operation temperatures of 570° C. This is a very satisfactory result.

The foregoing disclosure and description are illustrative and explanatory thereof, and various changes in the details of the method and apparatus can be made without departing from the spirit of the invention.

We claim:

1. A method for forming a thin film solid oxide fuel cell, comprising:

a. supplying a thin continuous metal foil substrate having a first and a second side;

b. forming a plurality of holes by developing a photoresist pattern on the second side, and depositing a thin film layer on the photoresist pattern and on the second side, to form an anode layer;

c. removing the photoresist pattern from the second side to reveal a plurality of holes extending through the anode layer to the metal foil substrate, to form a patterned porous anode;

d. depositing a thin film electrolyte layer on the second side;

e. removing the first side of the metal foil substrate, thus exposing the holes filled with electrolyte; and f. depositing a thin film cathode on the second side, to form a thin film solid oxide fuel cell.

2. The method of claim 1 wherein step (f) is performed before step (e).

3. The method of claim 1 wherein the metal foil substrate is treated to expose an atomically ordered surface on the second side of the metal foil before step (b).

4. The method of claim 3 wherein the metal foil substrate is treated by roll-texturing.

5. The method of claim 3 wherein the metal foil substrate is treated by ion beam assisted deposition.

6. The method of claim 1 wherein a buffer layer is applied to the second side of the metal foil substrate before step (b).

7. The method of claim 1 wherein the step of depositing a thin film electrolyte layer is performed using pulsed laser deposition.

8. The method of claim 1 wherein the step of depositing a thin film electrolyte layer is performed using metal organic chemical vapor deposition.

9. The method of claim 1 wherein the steps (b) and (c) are performed by depositing a thin film layer followed by photolithography and etching.

10. The method of claim 1 wherein the step of forming a plurality of holes through the anode metal foil is performed by depositing a thin film layer followed by a physical process selected from the processes of laser drilling, ion beam etching and reactive ion etching.

11. The method of claim 1 further comprising the step of determining atomic order of the films deposited in step (b) or (d) by x-ray diffraction measurements.

12. The method of claim 1 wherein the metal foil substrate is hydrogen-permeable and at least part of the substrate is not removed in step (c).

13. The method of claim 1 further comprising the step of depositing a plurality of layers in step (d).

14. The method of claim 1 wherein in step (f) the cathode is deposited at a first temperature and further comprising the step of increasing the temperature of the cathode to a temperature higher than the first temperature so as to form a porous columnar structure in the cathode.

15. A method for forming a stack of thin film solid oxide fuel cells, comprising:

supplying a plurality of thin film solid oxide fuel cells formed according to claim 1; and interconnecting the fuel cells by depositing a layer of interconnecting material between an anode of a first fuel cell and a cathode of a second fuel cell, the layer having channels for transport of fuel and oxidizer to the first and second fuel cells.

16. The method of claim 15 wherein the step of depositing is performed by pulsed laser deposition, metal organic chemical vapor deposition, sputtering, evaporation or chemical deposition.

* * * * *